(12) United States Patent
Kato et al.

(10) Patent No.: US 8,280,173 B2
(45) Date of Patent: Oct. 2, 2012

(54) FEATURE POINT LOCATION DETERMINATION METHOD AND APPARATUS

(75) Inventors: Masami Kato, Sagamihara (JP); Takashi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 12/393,508

(22) Filed: Feb. 26, 2009

(65) Prior Publication Data

US 2009/0220157 A1 Sep. 3, 2009

(30) Foreign Application Priority Data

Feb. 29, 2008 (JP) .................................. 2008-051117

(51) Int. Cl.
*G06K 9/46* (2006.01)
(52) U.S. Cl. ........................................................ 382/201
(58) Field of Classification Search .................. 382/115, 382/116, 117, 118, 123, 124, 125, 173, 176, 382/177, 178, 190, 192, 193, 194, 195, 201, 382/203, 204, 205, 206
See application file for complete search history.

(56) References Cited

U.S. PATENT DOCUMENTS

| | | | | |
|---|---|---|---|---|
| 2008/0013836 A1* | 1/2008 | Nakamura et al. | ............. | 382/209 |
| 2008/0267459 A1* | 10/2008 | Nakada et al. | ................. | 382/118 |

FOREIGN PATENT DOCUMENTS

| | | |
|---|---|---|
| JP | 10-307923 A | 11/1998 |
| JP | 2002-063567 A | 2/2002 |
| JP | 2007-249280 A | 9/2007 |

OTHER PUBLICATIONS

Nov. 14, 2011 Japanese Office Action, is enclosed without an English Translation, that issued in Japanese Patent Application No. 2008-051117.
Xinguang Song, Chil-Woo Lee, Gang Xu, and Saburo Tsuji, "Extraction of Facial Organ Features Using Partial Feature Template and Global Constraints" The Journal of the Institute of Electronics, Information and Communication Engineers D-II vol. J77-DII No. 8 pp. 1601-1609, Aug. 1994 (Japanese document and Partial English translation).
Wiskott, Laurenz; Fellous, Jean-Marc; Kruger, Norbert; Von der Malsburg, Christoph; "Face Recognition by Elastic Bunch Graph Matching" IEEE Transactions on Pattern Analysis and Machine Intelligence, vol. 19, No. 7 p. 775-779, 1997.
Beumer, G.M.; Tao, Q.; Bazen, A. M.; Veldhuis, R.N.J. "A Landmark Paper in Face Recognition" Automatic Face and Gesture Recognition, 2006. FGR.2006. 7th International Conference on Volume, Issue, Apr. 10-12, 2006 pp. 6 pp.
The above reference was cited in a Jun. 18, 2012 Japanese Office Action, a copy of which is enclosed without an English Translation, that issued in Japanese Patent Application No. 2008-051117.

* cited by examiner

*Primary Examiner* — Brian Le
(74) *Attorney, Agent, or Firm* — Cowan, Liebowitz & Latman, P.C.

(57) ABSTRACT

A method for determining feature point locations in an image performs a first search in a predetermined first search area to search for locations of plural feature points in the image, corrects the locations of the plural feature points based on a geometric layout relationship among the plural feature points searched for, sets a second search area based on the corrected location of each of the feature points, and performs a second search in the second search area to search for the location of each of the feature points. Then, the method determines reliability of the location of each feature point searched for by the second search and selects one of the corrected location and the location searched for by the second search, as a location of the feature point.

12 Claims, 14 Drawing Sheets

FIG. 19

| FEATURE IDENTIFIER | SEARCH AREA 1 | SEARCH AREA 2 | DISTANCE THRESHOLD | RELIABILITY THRESHOLD 1 | RELIABILITY THRESHOLD 2 |
|---|---|---|---|---|---|
| 0 | Ar_1_0 | Ar_2_0 | Th_D_0 | Th_C_1_0 | Th_C_2_0 |
| 1 | Ar_1_1 | Ar_2_1 | Th_D_1 | Th_C_1_1 | Th_C_2_1 |
| 2 | Ar_1_2 | Ar_2_2 | Th_D_2 | Th_C_1_2 | Th_C_2_2 |
| 3 | Ar_1_3 | Ar_2_3 | Th_D_3 | Th_C_1_3 | Th_C_2_3 |
| 4 | Ar_1_4 | Ar_2_4 | Th_D_4 | Th_C_1_4 | Th_C_2_4 |
| 5 | Ar_1_5 | Ar_2_5 | Th_D_5 | Th_C_1_5 | Th_C_2_5 |
| 6 | Ar_1_6 | Ar_2_6 | Th_D_6 | Th_C_1_6 | Th_C_2_6 |
| 7 | Ar_1_7 | Ar_2_7 | Th_D_7 | Th_C_1_7 | Th_C_2_7 |
| 8 | Ar_1_8 | Ar_2_8 | Th_D_8 | Th_C_1_8 | Th_C_2_8 |
| 9 | Ar_1_9 | Ar_2_9 | Th_D_9 | Th_C_1_9 | Th_C_2_9 |
| 10 | Ar_1_10 | Ar_2_10 | Th_D_10 | Th_C_1_10 | Th_C_2_10 |
| 11 | Ar_1_11 | Ar_2_11 | Th_D_11 | Th_C_1_11 | Th_C_2_11 |
| 12 | Ar_1_12 | Ar_2_12 | Th_D_12 | Th_C_1_12 | Th_C_2_12 |
| 13 | Ar_1_13 | Ar_2_13 | Th_D_13 | Th_C_1_13 | Th_C_2_13 |

FEATURE POINT LOCATION DETERMINATION METHOD AND APPARATUS

BACKGROUND OF THE INVENTION

1. Field of the Invention

The present invention relates to a feature point location determination method and apparatus used for face image recognition and the like.

2. Description of the Related Art

In face recognition using image data and the like, location determination of facial organs or equivalent characteristic parts (hereinafter referred to as feature points) is an important task and often governs recognition performance.

The determined locations of the feature points are used as reference points in normalizing size and rotation of a target image and extracting sub-regions needed for recognition from the target image. To calculate feature values suitable for recognition, it is desired to localize feature points accurately.

X. Song et al [X. Song, C. Lee, G. Xu, and S. Tsuji, "Extracting facial features using partial feature templates and global constraints," Transactions of the Institute of Electronics, Information and Communications Engineers (D-II), Vol. J77-D-II, No. 8, pp. 1601-1609 (1994)] describe a technique for extracting sets of possible feature points from candidate organs extracted by template matching, comparing the feature points with global geometric constraints modeled in advance, and thereby determining locations of the feature points.

L. Wiskott et al [Wiskott, Laurenz; Fellous, Jean-Marc; Kruger, Norbert; and Von der Malsburg, Christoph; "Face Recognition by Elastic Bunch Graph Matching", IEEE Trans. Pattern Analysis and Machine Intelligence, Vol. 19, No. 7, p. 775-779, 1997] describe a technique for searching for location of an organ by placing a candidate location of an organ on grid points which provides geometric constraints and by deforming the grid points such that a feature value on the grid points will coincide with a feature value of an object to be detected. The deformation of the grid points is determined using a predetermined evaluation function based on the agreement between the feature values as well as on amounts of distortion of the grid points.

G. M. Beumer et al [Beumer, G. M.; Tao, Q.; Bazen, A. M.; Veldhuis, R. N. J.; "A landmark paper in face recognition" Automatic Face and Gesture Recognition, 2006. FGR 2006. 7th International Conference on, 10-12 Apr. 2006 Page(s): 6 pp.] describe a technique for correcting locations of feature points using an eigenspace with coordinate values of the feature points used as an input vector.

FIG. 2 is a diagram outlining the technique described by G. M. Beumer et al (2006). In step S21, i.e., in a candidate feature point location determination process, plural identification means identify locations of feature points. FIG. 3 shows an example of locations of feature points to be identified. In this example, fourteen feature points (defined to be a set of feature points) indicated by "X" are determined. For example, feature point 31 corresponds to the outside corner of the eye on the left as viewed in FIG. 3.

In step S22, i.e., in an eigenspace projection process, coordinate values of the feature points determined in the candidate feature point location determination process (step S21) are arranged into an input vector and projected onto an eigenspace. When there are fourteen feature points, input data is a 28-dimensional vector (a vector which has fourteen horizontal coordinate values and fourteen vertical coordinate values as elements). The eigenspace is formed of eigenvectors created from feature point location data by learning in advance. The eigenvectors are created by principal component analysis in advance using plural input vectors (feature point location data) which corresponds to accurate feature point locations. In step S23, a dimension reduction process reduces dimensionality by deleting projected values corresponding to eigenvectors with small eigenvalues. For example, 28-dimensional projection vector has its dimensionality reduced to several dimensions. In step S24, i.e., in an eigenspace inverse projection process, the input vector projected onto the eigenspace is inverse-projected onto a real space using the eigenvector and the projection vector whose dimensionality has been reduced in the dimension reduction process (step S23). In steps S22 to S24, any input vector that has outliers and cannot be expressed in the eigenspace is corrected into a vector which can be expressed in the eigenspace.

That is, in steps S22 to S24, the input vector is corrected based on statistical geometric constraints. FIG. 4 is a diagram illustrating an example in which a feature point location is extracted erroneously in the candidate feature point location determination process (step S21). In this example, feature point 41, which is actually a tip of an eyebrow, has been determined erroneously to be the outside corner of an eye. As an input vector created from the feature point locations shown in FIG. 4 go through steps S22 to S24, the location of feature point 41 is corrected so as to be expressed in the eigenspace. FIG. 5 is a diagram showing an example of a feature point location which results when the input vector is subjected to the eigenspace inverse projection process (step S24). It shows how feature point 41 is corrected into feature point 51. In step S25, a distance calculation process calculates distance between coordinates of each candidate feature point outputted from the candidate feature point location determination process (step S21) and corresponding feature point coordinates corrected in steps S22 to S24. That is, the distance between corresponding feature point locations before and after the correction is calculated. In the example of FIGS. 4 and 5, distance in image coordinates between corresponding feature points 41 and 51 is calculated.

In step S26, a selection process compares the each feature point's distance calculated in the distance calculation process (step S25) with a predetermined threshold and thereby selects either the uncorrected coordinates or the coordinates corrected in steps S22 to S24. The selection process (step S26) selects the corrected coordinates if the calculated distance exceeds the threshold, and selects the uncorrected coordinates if the calculated distance does not exceed the threshold. Reference numeral 27 denotes a group of steps repeated for each feature point and 28 denotes a group of steps repeated for each pair of corresponding feature points. Then, using a set of feature points resulting from the selection process (step S26) as an input vector and repeating a coordinate correction process in steps S22 to S26 multiple times, the technique determines proper locations of feature points.

Techniques, such as the one described by Song et al (1994), which extract multiple sets of feature points as candidates and determine an optimal set of feature points using geometric constraints based on a layout relationship among the feature points have a problem in terms of computational complexity. The technique described by L. Wiskott et al (1997) also involves increased computational complexity because the technique searches for the location of an organ by deforming grid points and checking for the agreement between feature values repeatedly.

The technique described by G. M. Beumer et al (2006) also requires the procedures to be repeated multiple times as described above. Besides, since the technique depends on performance of the candidate feature point location determination process (step S21), even multiple iterations may not provide sufficient accuracy.

SUMMARY OF THE INVENTION

An exemplary embodiments of the present invention provides an apparatus and a method, which enable determination of plural feature point locations at high accuracy using simple processes.

According to one aspect of the present invention, there is provided a feature point location determination method comprising a first search step of searching for locations of a plurality of feature points in a predetermined first search area in an image, a location correction step of correcting the locations of the plurality of feature points based on a geometric layout relationship among the plurality of feature points searched for by the first search step, a second search step of setting a second search area based on the locations of the plurality of feature points corrected by the location correction step and searching for locations of the feature points in the second search area, and a selection step of determining reliability of the location of each of the feature points searched for by the second search step and thereby selecting one of the location corrected by the location correction step and the location searched for by the second search step, as the location of each of the feature points to be localized.

Furthermore, according to another aspect of the present invention, there is provided a feature point location determination apparatus comprising a first search unit configured to search for locations of a plurality of feature points in a predetermined first search area in an image, a location correction unit configured to correct the locations of the plurality of feature points based on a geometric layout relationship among the plurality of feature points searched for by the first search unit, a second search unit configured to set a second search area based on the locations of the feature points corrected by the location correction unit and searching for locations of the feature points in the second search area, and a selection unit configured to determine reliability of the location of each of the feature points searched for by the second search unit and thereby selecting one of the location corrected by the location correction unit and the location searched for by the second search unit, as the location of each of the feature points to be localized.

Further features of the present invention will become apparent from the following description of exemplary embodiments with reference to the attached drawings.

BRIEF DESCRIPTION OF THE DRAWINGS

FIG. 19 is a diagram showing an exemplary data structure of a table which contains search areas, a distance threshold, and reliability thresholds for each feature point.

DESCRIPTION OF THE EMBODIMENTS

Exemplary embodiments of the present invention will now be described in detail in accordance with the accompanying drawings.

First Embodiment

Operation of a first embodiment will be described in detail with reference to FIGS. 1 to 12.

Figure 6:
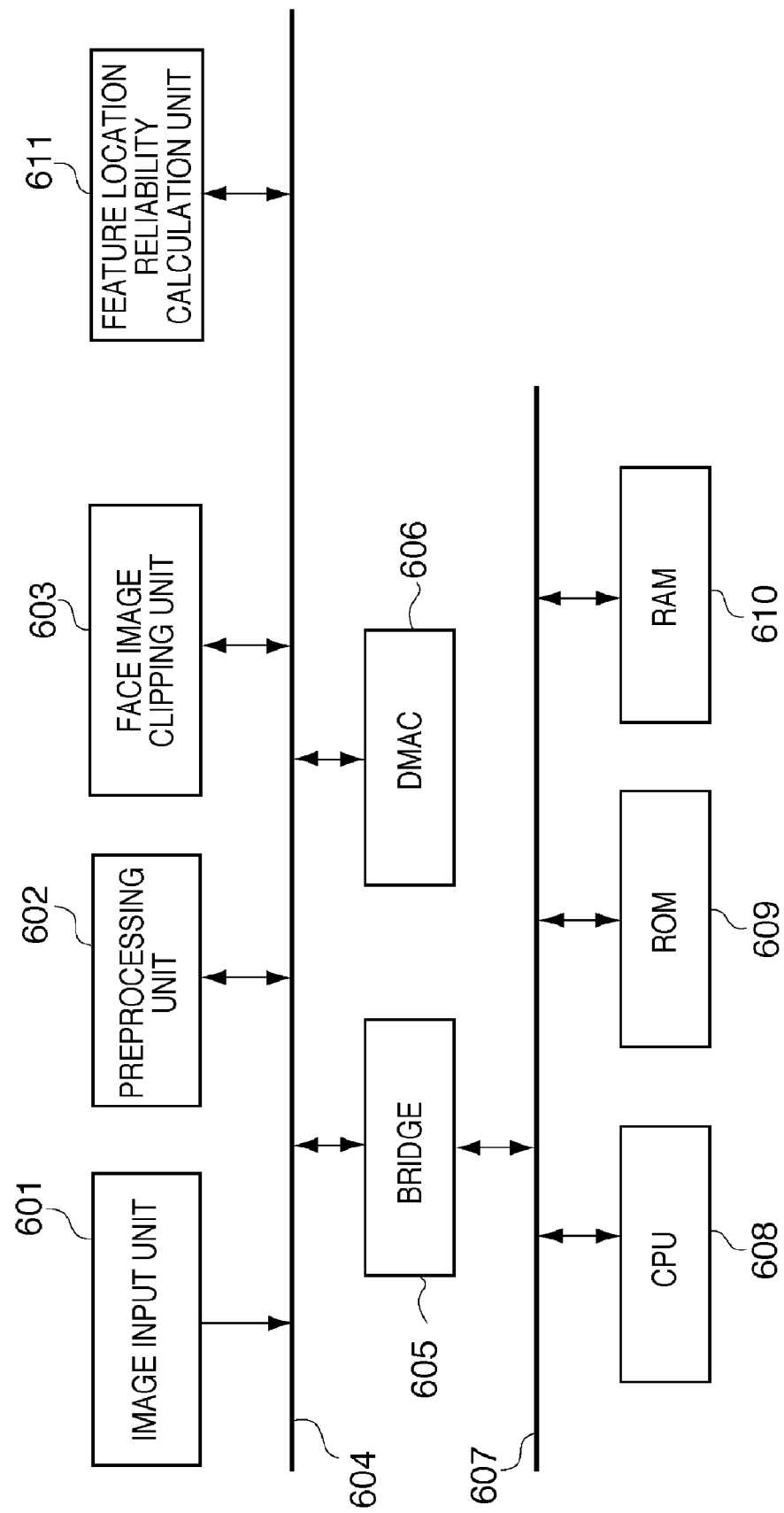
FIG. 6 is a block diagram showing an exemplary configuration of a feature point location determination apparatus according to first to fifth embodiments.

FIG. 6 is a block diagram showing an exemplary configuration of a feature point location determination apparatus according to the first embodiment. The apparatus has a function to determine plural feature point locations in face image data.

In FIG. 6, an image input unit 601 includes an optical system and a photoelectric converter such as a CCD (Charge-Coupled Device) or CMOS (Complimentary Metal Oxide Semiconductor) sensor. Furthermore, the image input unit 601 includes a driver circuit which controls the sensor, AD converter, signal processing circuit which performs various types of image correction, frame buffer, and the like. A preprocessing unit 602 performs various types of preprocessing so that various types of processing in subsequent stages can be performed effectively. Specifically, the preprocessing unit 602 performs color conversion, contrast correction, and other image data conversion of the image data acquired by the image input unit 601, on a hardware basis.

Figure 7:
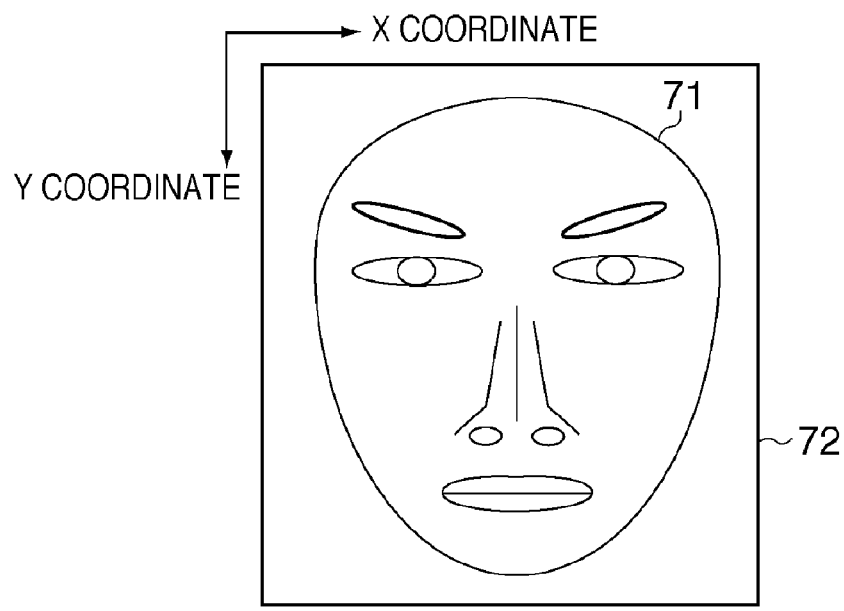
FIG. 7 is a diagram showing an example of normalized face image data.

A face image clipping unit 603 performs a face detection process on the image data converted by the preprocessing unit 602. Any of various face detection techniques proposed conventionally may be used here. Furthermore, the face image clipping unit 603 clips normalized face image data normalized to a predetermined size from each detected face. In this case, size and in-plane rotation are normalized using results of face detection. FIG. 7 is a diagram showing an example of normalized face image data. The face image clipping unit 603 clips an image plane 72 of a predetermined size containing a normalized face image 71. Hereinafter, the location of a feature point is defined to be coordinates of the feature point in the image plane 72. Also, coordinate data is expressed in a coordinate system (x coordinate, y coordinate) with the origin at the upper left corner of the image plane 72.

A feature location reliability calculation unit 611 calculates a feature location reliability map which provides information about likelihood of existence of a feature point. Details of the feature location reliability calculation unit 611 will be described later with reference to FIG. 1. A DMAC (Direct Memory Access Controller) 606 manages data transfer among processing units on an image bus 604 as well as data transfer between devices on the image bus 604 and a RAM 610 or ROM 609 on a CPU (Central Processing Unit) bus 607. A bridge 605 provides a bridging function between the image bus 604 and CPU bus 607.

A CPU 608 performs major processes according to the present embodiment and controls operation of the entire apparatus. The ROM 609 stores instructions which define operations to be performed by the CPU 608. The RAM 610 is a working memory needed for operation of the CPU 608. A DRAM (Dynamic RAM) or other memory with a relatively large capacity is used as the RAM 610. The CPU 608 can access the processing units on the image bus 604 via the bridge 605. Since the image bus 604 and CPU bus 607 are provided separately, the CPU 608 can operate concurrently with the hardware-based processing units 601, 602, 603, and 611.

Figure 1:
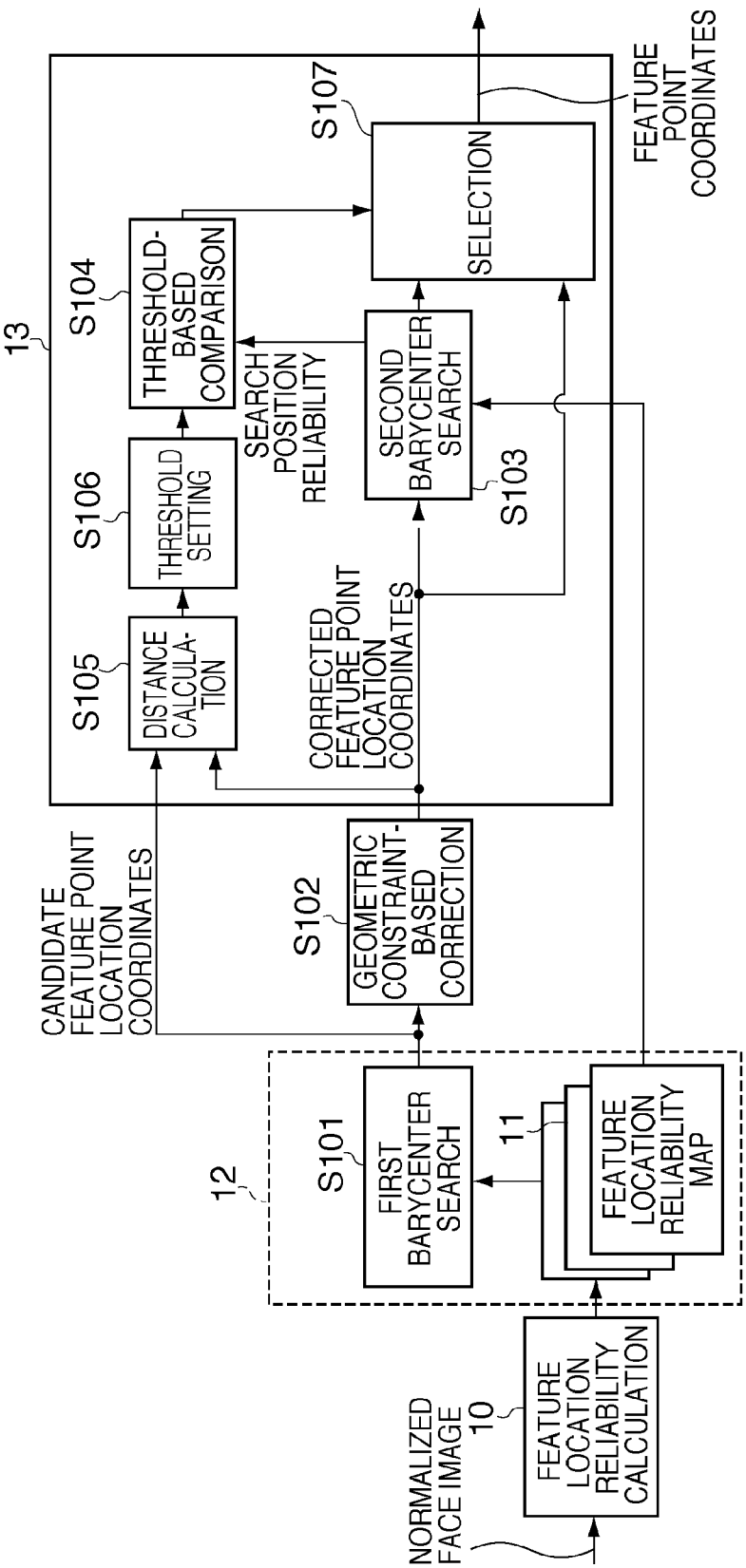
FIG. 1 is a diagram showing a flow of a feature point location determination process according to a first embodiment.
Figure 2:
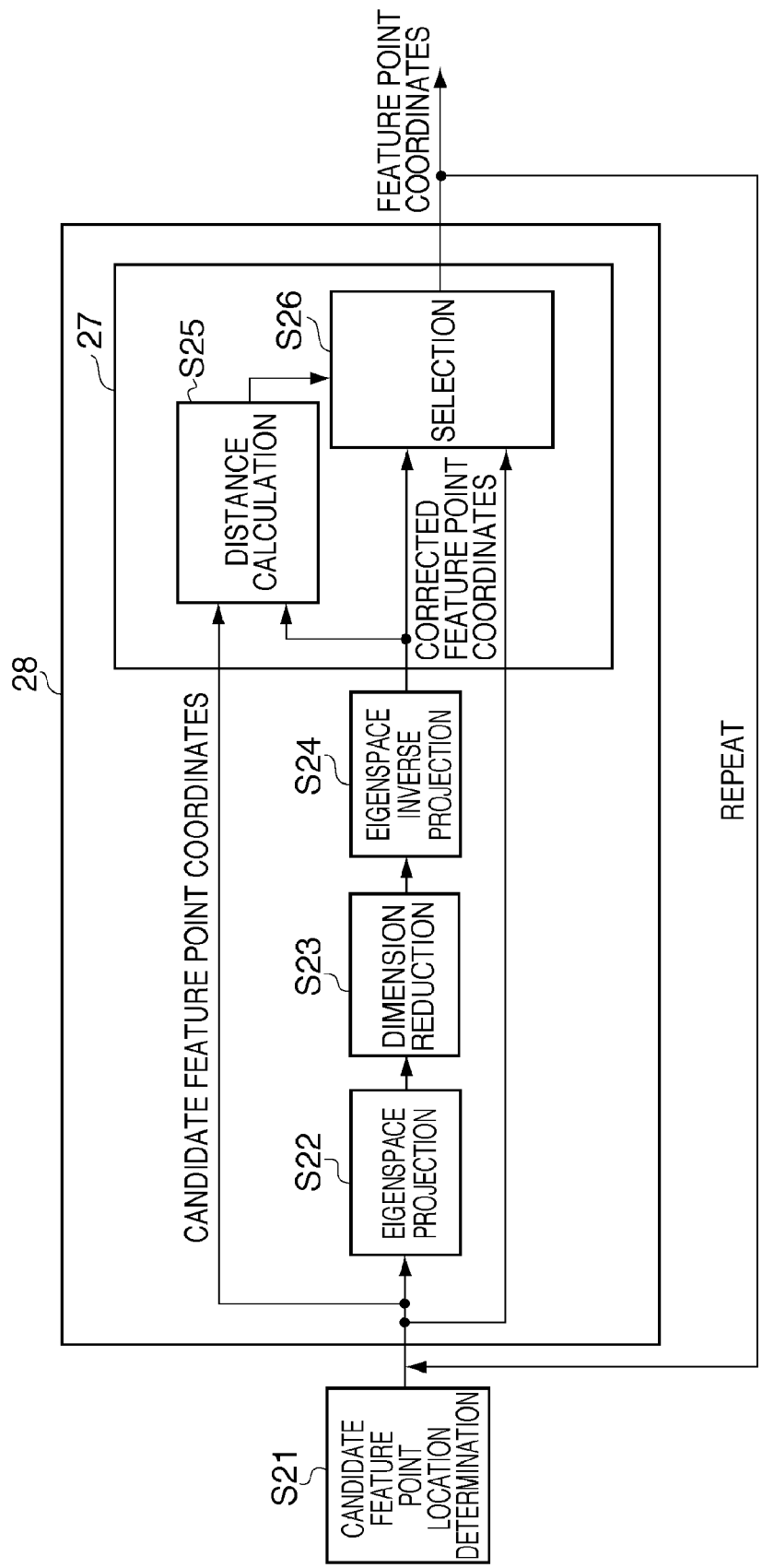
FIG. 2 is a diagram showing a flow of a typical feature point location determination process.
Figure 3:
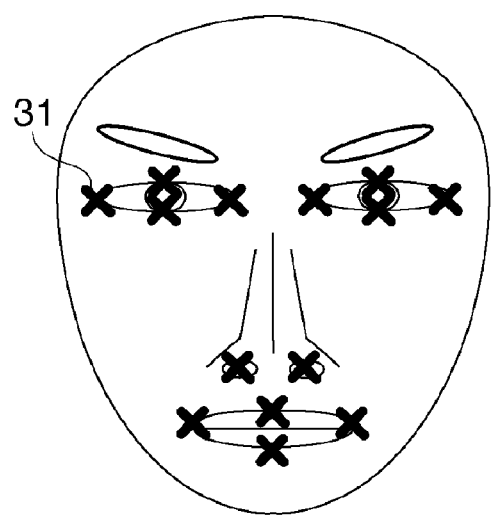
FIG. 3 is a diagram showing an example of feature points.
Figure 4:
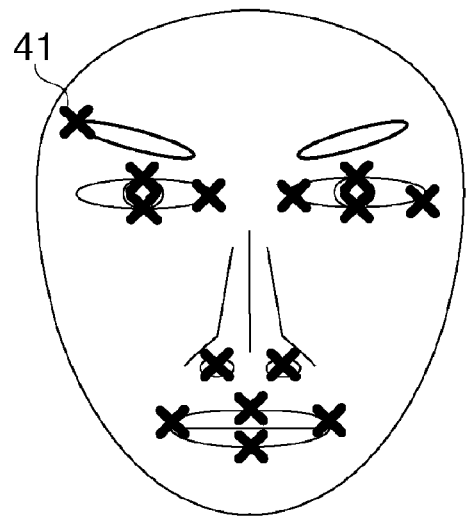
FIG. 4 is a diagram showing an example of feature points including a feature point determined erroneously.
Figure 5:
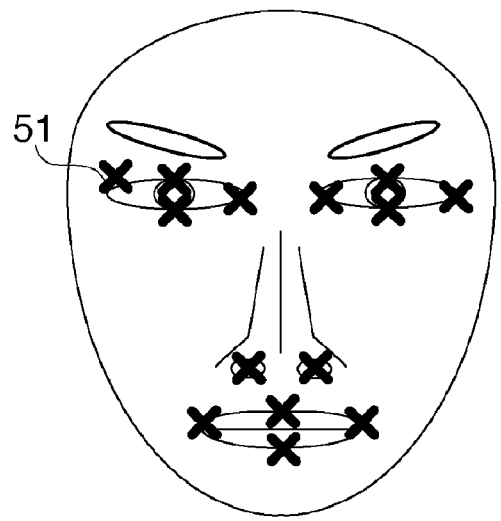
FIG. 5 is a diagram showing an example of feature points including a feature point corrected for erroneous determination.

FIG. 1 is a diagram showing a major process flow of a feature point location determination process according to the first embodiment. In FIG. 1, steps S101 to S107 are carried out by the CPU 608. The operation of the first embodiment will be described in detail below with reference to FIGS. 1 and 6.

The face image clipping unit 603 stores the face image data normalized for predetermined size based on the results of face detection in a built-in RAM (not shown). The stored data is transferred to a RAM (not shown) of the feature location reliability calculation unit 611 via the DMAC 606. Using the image data stored in the RAM, the feature location reliability calculation unit 611 starts calculating reliability which represents likelihood of existence of a candidate feature point location (feature location reliability calculation process 10 in FIG. 1). A reliability image thus generated is defined to be a feature location reliability map 11. To calculate the feature location reliability (hereinafter also referred to as reliability), various techniques proposed conventionally are available for use. The simplest way is to prepare templates which represent characteristics of corresponding feature points by learning and use the agreement between an image at a target location and the corresponding template as reliability.

Figure 8:
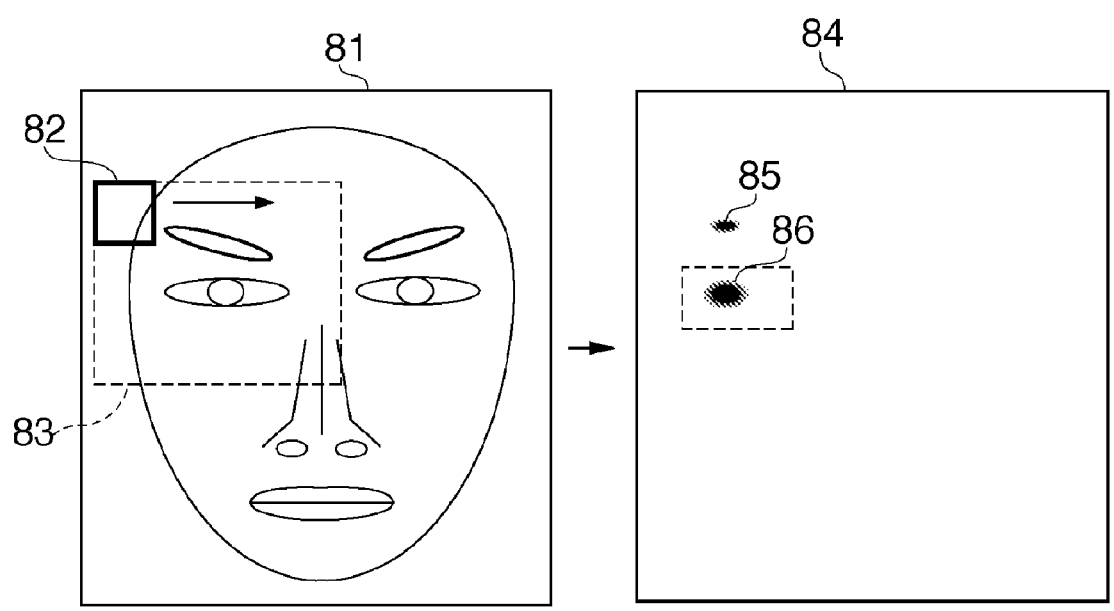
FIG. 8 is a diagram illustrating an example of a feature point search and feature location reliability map.

FIG. 8 is a diagram schematically illustrating how a feature location reliability map is generated. A template 82 is used for template matching. A search area 83 is a barycenter calculation area to be subjected to template matching. The template 82 is scanned in the search area 83 and the agreement with the image at the target location is recorded to generate a feature location reliability map. That is, the feature location reliability map is a buffer memory in which reliability has been recorded instead of image data. A sufficiently large area containing a desired endpoint is set as the search area 83 to allow for individual differences, facial expressions, orientation of the face, normalization errors caused by the face image clipping unit 603, and the like.

An example of a feature location reliability map is schematically illustrated in a box 84. Locations 85 and 86 denote targeted feature point locations with high reliability (in this case, locations which closely agree with the template). Denser parts correspond to locations with higher reliability. The example shows results of matching with the template 82 used to detect the corner point of the eye on the left as viewed in FIG. 8. The location 85 denotes the left tip of an eyebrow detected erroneously.

The feature location reliability calculation unit 611 generates a feature location reliability map, such as described above, for each feature point. For example, when determining fourteen feature points as described in FIG. 3, the feature location reliability calculation unit 611 generates fourteen feature location reliability maps 11 using fourteen types of feature point detection template. Incidentally, to store the feature location reliability maps 11, only data within the search area 83 may be stored in memory instead of the area 84 corresponding to an image 81. Although a technique for calculating reliability using template matching has been described herein, various conventional techniques are available for use including those which use neural networks or cascaded filters.

The generated feature location reliability maps 11 are transferred to the RAM 610 via the DMAC 606. When the transfer is finished, the CPU 608 starts executing a program for feature point determination (steps S101 to S107).

In FIG. 1, steps enclosed in boxes 12 and 13 are repeated for each feature point. In a first barycenter search (step S101), the CPU 608 calculates the barycenter of feature point location reliability values in the search area 83 of the feature location reliability map 11 for each feature point. Barycenter values obtained here are designated as coordinates of a candidate feature point location. Any of generally known barycenter search techniques can be used. Besides, a maximum value of the feature point location reliability values in the search area 83 may be used instead of the barycenter. Thus, the feature location reliability calculation process 10 and first barycenter search (step S101) perform the search for the locations of plural feature points in a predetermined first search area in an image (normalized face image in the case of the present embodiment).

In a geometric constraint-based correction (step S102), the coordinates of all the candidate feature point locations obtained in the first barycenter search (step S101) are corrected together based on constraints on a geometric layout of feature points. In the geometric constraint-based correction (step S102) according to the present embodiment, coordinate locations are corrected through the corrections (steps S22 to S24 shown in FIG. 2) which use an eigenspace. Specifically, the CPU 608 projects coordinate data $(x_i, y_i)$ (where i=0 to 13) generated in the first barycenter search (step S101) onto the eigenspace as an input vector made up of elements vj (where j=0 to 27) (step S22). Incidentally, an eigenvector E for projection onto the eigenspace is created by principal component analysis in advance using data sets which represent accurate locations of feature points for plural face images. The data sets include various data containing variations (sizes, orientations, and expressions of faces) according to purpose.

Figure 9:
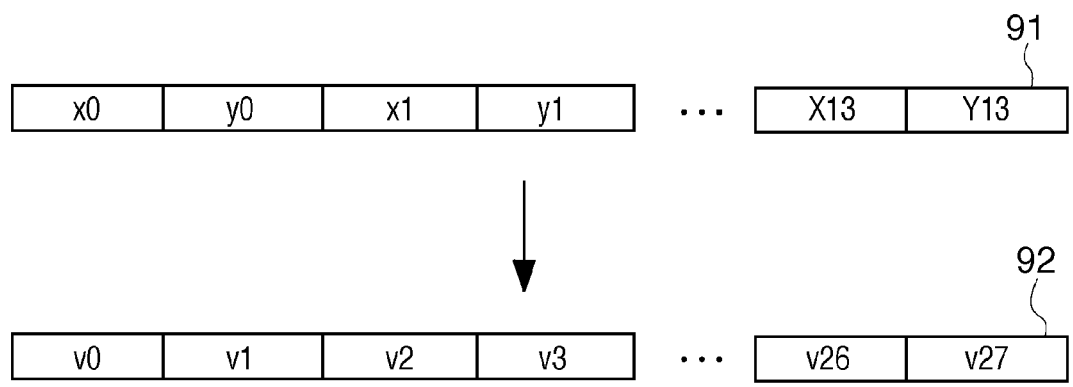
FIG. 9 is a diagram illustrating a relationship between feature point coordinates and an input vector during an eigenspace projection.

FIG. 9 is a diagram illustrating a relationship between coordinate data $(x_i, y_i)$ (where i=0 to 13) and an input vector V made up of elements vj (where j=0 to 27). A coordinate data string 91 made up of the coordinate data arranged in a row is used, as it is, as an input vector 92. For example, vector element v0 corresponds to coordinate value x0. In step S22, the eigenspace projection process calculates a projection vector P according to Formula (1) using a vector obtained by subtracting an average vector Av generated when the eigenvector is generated from the input vector V as well as the eigenvector E.

$$P=E^T(V-Av) \quad (1)$$

Calculation results of Formula (1) correspond to the projection vector for the eigenspace. In step S23, the dimension reduction process reduces the dimensionality of the projection vector. In step S24, the eigenspace inverse projection process generates a correction vector for the input vector from the projection vector whose dimensionality has been reduced. The correction vector X' is calculated from the eigenvector E and average vector Av using Formula (2).

$$X'=EP+Av \quad (2)$$

The inverse-projected correction vector X', which has the format of the input vector 92 shown in FIG. 9, can be associated with the coordinate data string 91 as in the case of the input vector. Since the processes in steps S22 to S24 use linear matrix calculations, matrix calculations for the eigenspace can be combined into a single matrix calculation. In this way, the use of an eigenspace makes it possible to perform correction based on the layout relationship among feature points using simple processes.

As described above, in the geometric constraint-based correction (step S102), the CPU 608 corrects the coordinates of candidate feature point locations based on the layout relationship among the feature points using statistical geometric constraints from an eigenspace. In a second barycenter search (step S103), the CPU 608 searches for the feature location reliability map 11 again using the candidate feature point location coordinates corrected in the geometric constraint-based correction process. That is, in the second barycenter search (step S103), the CPU 608 newly sets a second search area based on each feature point location corrected in the geometric constraint-based correction (step S102) and searches for the location of the feature point in the second search area. The second search area, for example, is an area of a predetermined size centered on the feature point location corrected in the geometric constraint-based correction process (step S102). Preferably, the second search area is smaller than the first search area used for the first barycenter search (step S101).

Figure 10:
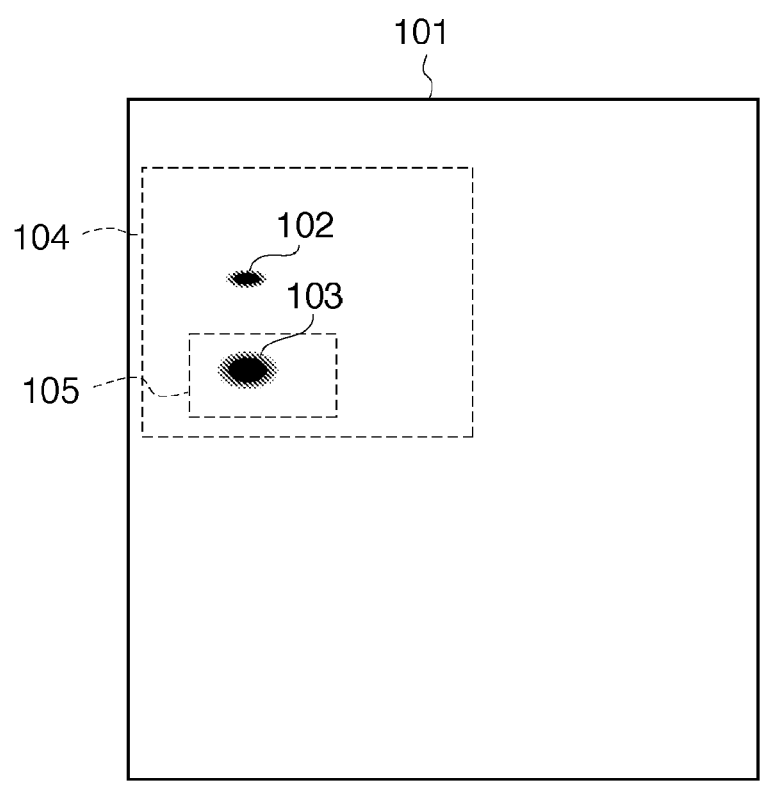
FIG. 10 is a diagram illustrating an example of distribution in a feature location reliability map.

FIG. 10 shows an example of a feature location reliability map. In the feature location reliability map 101, distributions at high-reliability locations are shown schematically, being denoted by reference numerals 102 and 103. The distribution 103 denotes a reliability distribution near a desired feature point and the distribution 102 denotes a reliability distribution near an erroneous feature point. A first search area 104 (which corresponds to the search area 83) used in the first barycenter search (step S101) and a barycenter calculation area (second search area) 105 is used in the second barycenter search (step S103). In the first barycenter search (step S101), the first search area 104 is set to be sufficiently large as described above. However, in the second barycenter search (step S103), the second search area 105 used for barycenter calculation is a small area centered on the corrected feature point location coordinates. That is, in the second barycenter search (step S103), the second search area is limited to a small area based on the assumption that the reliability of the candidate point has been increased as a result of the geometric constraint-based correction which has corrected the feature point location using geometric constraints.

Figure 12:
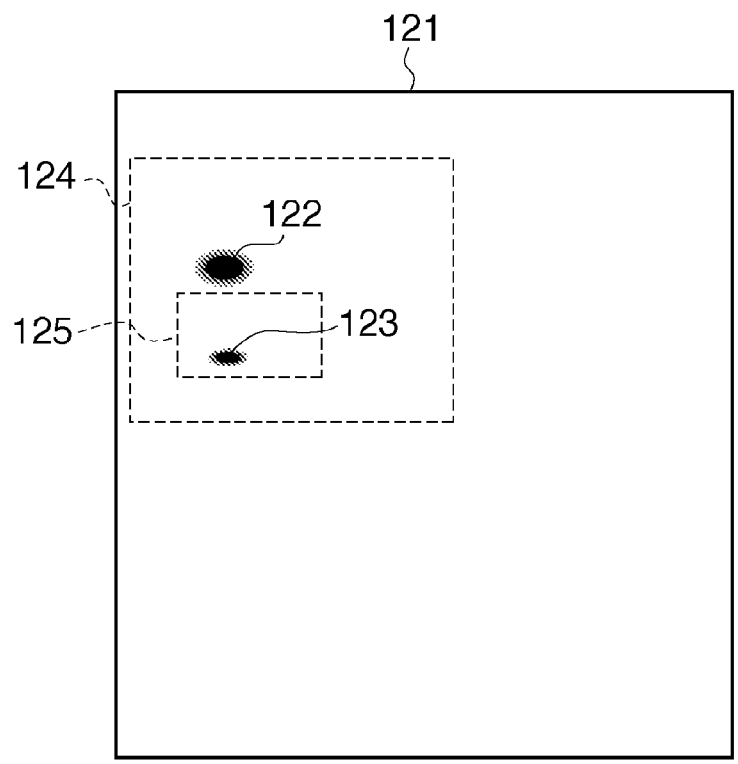
FIG. 12 is a diagram illustrating an example of distribution in a feature location reliability map.

In FIG. 10, barycenter calculation in the first search area 104 will be affected by the reliability distribution 102 resulting from misdetection. In contrast, barycenter calculation in the second search area 105 makes it possible to calculate the correct feature point more accurately by eliminating the effect of the reliability distribution 102 resulting from misdetection. FIG. 12 is a diagram showing a feature location reliability map 121, another example of the feature location reliability map 11. Distribution 123 denotes a reliability distribution near a desired feature point and distribution 122 denotes a reliability distribution near an erroneous location. In this case, since the reliability near the erroneous location is higher, when the first barycenter search (step S101) searches for a barycenter in a larger first search area 124, the search involves large errors near the desired point. However, by searching for a barycenter in a smaller second search area 125 using the coordinates corrected in the geometric constraint-based correction (step S102), it is possible to determine a feature point location more accurately by reducing the effect of reliability distribution 122 resulting from misdetection.

Step S107 corresponds to a selection in which the coordinates of a candidate feature point location is selected. In the selection (step S107), the CPU 608 selects either the corrected coordinates of the feature point location or coordinates resulting from the second barycenter search (step S103) based on selection conditions. According to the present embodiment, the CPU 608 selects coordinates by comparing a value obtained by normalizing the sum total of feature point location reliability values in the second search area 105 on the feature location reliability map 101 or the second search area 125 on the feature location reliability map 121 with a threshold. Hereinafter, the normalized sum total of feature point location reliability values in the search area is defined to be an search position reliability. That is, the search position reliability represents the reliability of the feature point location after the second search. The CPU 608 calculates the search position reliability by dividing the sum total—calculated during the calculation of the barycenter in the second barycenter search (step S103)—by the area of the barycenter calculation area (the second search area 105).

In the selection (step S107), if the search position reliability is lower than the threshold, the CPU 608 determines that detection reliability for the feature point location in the feature location reliability calculation process 10 is low and outputs the results of the geometric constraint-based correction (step S102) as final coordinates. That is, higher confidence is placed in the feature point location corrected based on the geometric layout relationship. This occurs when the feature point location is not extracted accurately due to the effect of occlusion or self-shadowing. On the other hand, when the search position reliability is higher than the threshold, the CPU 608 determines in the selection (step S107) that detection reliability for the feature point location is high and outputs the results of the second barycenter search (step S103) as final coordinates. Incidentally, although the search position reliability has been calculated using the sum total of feature point location reliability values for the sake of simplicity, any technique may be used as long as the technique provides a value which represents the reliability of the feature point location after the second search.

In a threshold-based comparison (step S104), the CPU 608 compares the search position reliability with a threshold determined in a threshold setting (step S106). In the threshold setting (step S106), the CPU 608 determines the threshold based on results of a distance calculation (step S105). In the distance calculation (step S105), the CPU 608 calculates distance between the feature point coordinates determined in the first barycenter search (step S101) and the feature point coordinates corrected in the geometric constraint-based correction (step S102). In the distance calculation (step S105), the CPU 608 calculates, for example, the distance between the feature point locations before and after the correction made by the geometric constraint-based correction (step S102).

Figure 11:
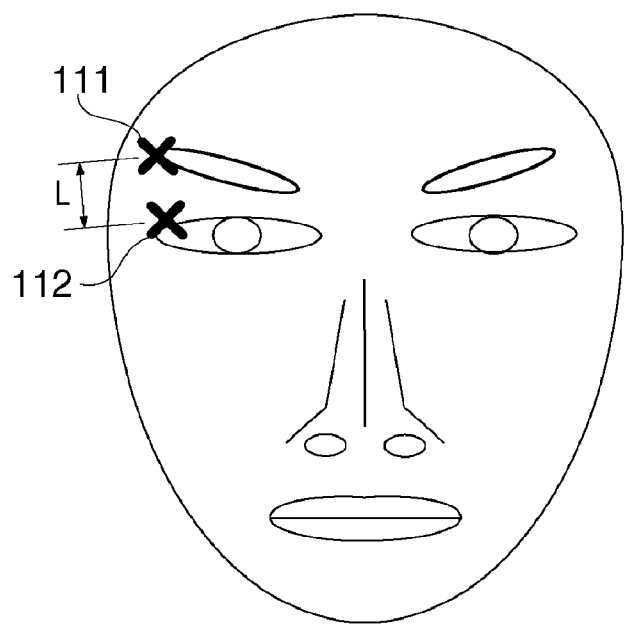
FIG. 11 is a diagram illustrating an example of feature point locations before and after correction.

FIG. 11 is a diagram illustrating an example of feature point locations before and after a correction made by the geometric constraint-based correction (step S102). It is assumed that the correction is made to the outside corner of the eye on the left as viewed in FIG. 11. The location of a feature point 111 is given by the feature point coordinates determined in the first barycenter search (step S101) which has detected the left tip of an eyebrow erroneously. The location of a feature point 112, to which the location of the feature point 111 has been corrected by the geometric constraint-based correction (step S102), is closer to the correct location of the eye corner. The distance calculation (step S105) calculates distance L between the coordinates of the two feature points 111 and 112. The distance L may be either Euclidean distance or Manhattan distance (Euclidean distance is used in FIG. 11).

In the threshold setting (step S106), the CPU 608 determines the threshold used in the threshold-based comparison (step S104), based on results of the distance calculation (step S105). For example, in the threshold setting (step S106), the CPU 608 selects one of two thresholds—large and small— prepared in advance, depending on the distance L between the coordinates. For example, the larger threshold is selected when the distance L is larger than a predetermined value, and the smaller threshold is selected when the distance L is not larger than the predetermined value (Formula (3)).

$$L > \text{distance threshold: large search position reliability threshold}$$

$$L \leq \text{distance threshold: small search position reliability threshold} \quad (3)$$

In the threshold-based comparison (step S104), the CPU 608 compares the search position reliability with the reliability threshold determined in the threshold setting (step S106). If a feature point has a large distance L between the coordinates, the feature point has been subjected to a major correction by the geometric constraint-based correction (step S102), and it is highly likely that the results of the feature location reliability calculation process 10 has low reliability. In this case, the larger threshold is used in the threshold-based comparison (step S104) to make it easier for the corrected feature point location coordinates to be selected. On the other hand, when the distance L between the coordinates is small, since it is considered that the results of the feature location reliability calculation process 10 has high reliability, the smaller threshold is used in the threshold-based comparison (step S104) to make it easier for the results of the second barycenter search process (step S103) to be selected.

In this way, credibility of the results of the feature location reliability calculation process 10 is determined based on magnitude of the correction made by the geometric constraint-based correction (step S102) and the search position reliability threshold is controlled accordingly. This makes it possible to select more appropriate feature point location detection results.

A group of steps enclosed in a box 13 are repeated for each feature point, meaning that all the feature points go through the processes of S103 to S107.

As a result of the above processes, the location of each feature point is determined. The CPU 608 stores the determined locations of the feature points in the RAM 610 or the like. When the present embodiment is applied to a human (or animal) face image recognition apparatus, the CPU 608 renormalizes face image data accurately and extracts a feature value needed for identification using the stored feature point locations. For example, the CPU 608 calculates the feature value of plural areas and regions with reference to the feature point locations and compares each local feature with registered data.

According to the first embodiment described so far, a final feature point location is searched for again using a feature point location subjected to geometric constraint-based correction. This makes it possible to realize highly accurate location determination using the feature location reliability calculation process 10 to its full capacity while at the same time using geometric constraints from an eigenspace. Also, by selecting either the results of the geometric constraint-based correction (step S102) or the results of the second barycenter search (step S103) depending on the search position reliability, it is possible to realize location determination by suppressing the effect of contrast or occlusion. Furthermore, by making determinations taking into consideration the reliability of the feature location reliability calculation process 10 and based on the magnitude of the correction made by the geometric constraint-based correction (step S102), it is possible to reduce the possibility of major misdetection.

Second Embodiment

Figure 13:
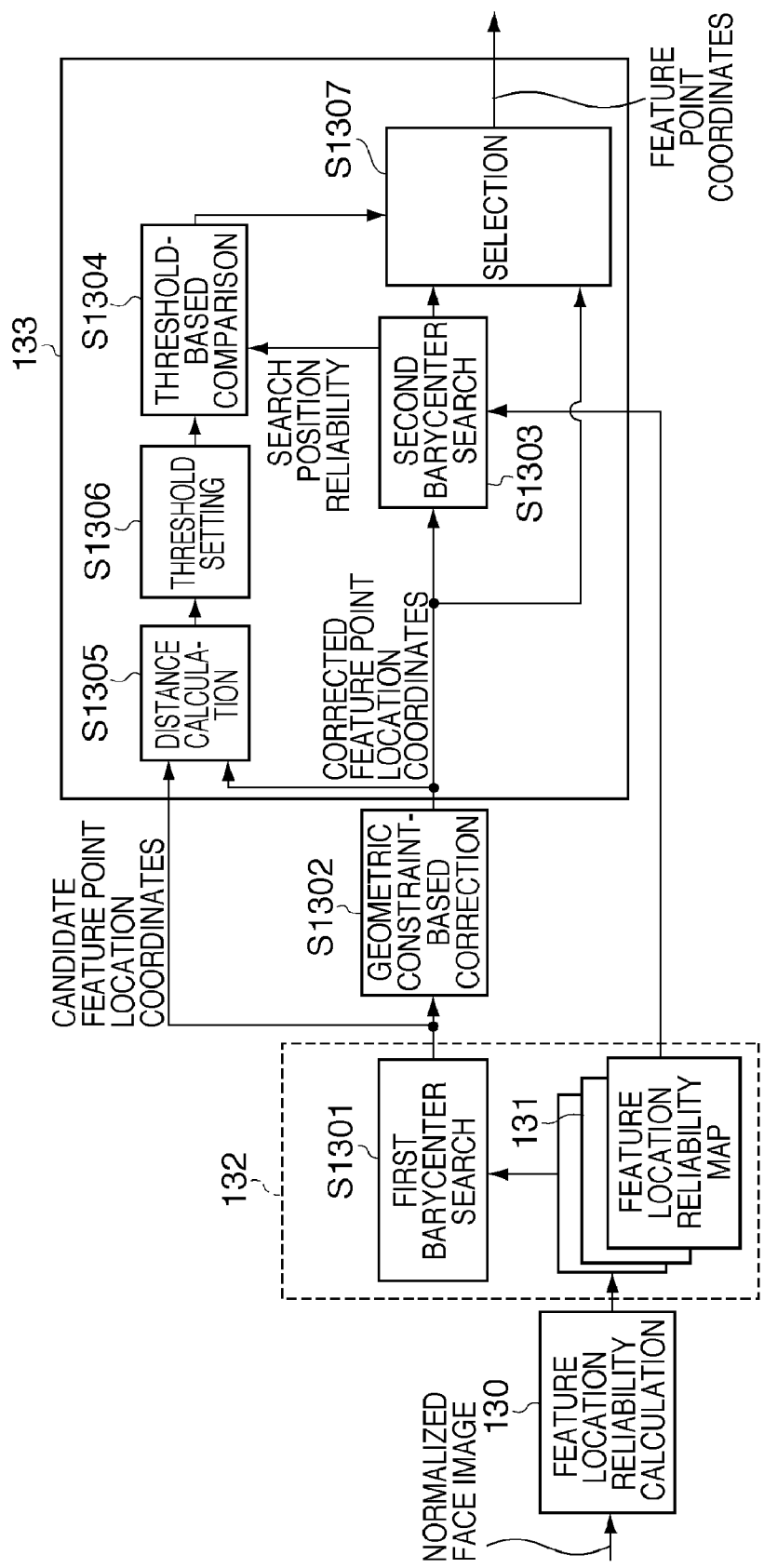
FIG. 13 is a diagram showing a flow of a feature point location determination process according to a second embodiment.

A feature point location determination apparatus according to a second embodiment will be described next. FIG. 13 is a diagram illustrating a major process flow of a feature point location determination process according to the second embodiment. In FIG. 13, steps S1301 to S1307 are carried out by the CPU 608.

Configuration of the feature point location determination apparatus according to the second embodiment is similar to that of the first embodiment (FIG. 6). Mainly differences from the first embodiment will be described below.

A feature location reliability calculation process 130 and feature location reliability map 131 in FIG. 13 are similar to the feature location reliability calculation process 10 and feature location reliability map 11 according to the first embodiment. Also, a first barycenter search (step S1301) and geometric constraint-based correction (step S1302) in FIG. 13 are similar to the first barycenter search (step S101) and geometric constraint-based correction (step S102) according to the first embodiment. That is, the first barycenter search (step S1301) and geometric constraint-based correction (step S1302) calculate candidate feature point location coordinates and corrected feature point location coordinates, respectively. Processes (a group of steps) enclosed in a box 132 are repeated for each feature point as in the case of the first embodiment.

In a feature point location search (step S1303), the CPU 608 newly extracts each feature point location from a normalized face image using corrected feature point location coordinates. The feature point location search (step S1303) uses a feature location extraction method different from the one used by the feature location reliability calculation process 130. Also, a second search area used by the feature point location search (step S1303) differs from a first search area used by the first barycenter search (step S1301).

Description will be given with reference to the example shown in FIG. 10. The first barycenter search (step S1301) searches the first search area 104 which is a large area and the feature point location search (step S1303) extracts a feature point from the second search area 105 which is a small area. Since the feature point location search (step S1303) uses a sufficiently small area, it is possible to apply a more advanced feature location extraction method by curbing increases in a processing load. Specifically, various pattern recognition techniques proposed conventionally are available for use as in the case of the first embodiment. By taking processing load requirements of the system into consideration, a method higher in performance than the method used by the feature location reliability calculation process 130 is selected for the feature point location search (step S1303). For example, high accuracy extraction method based on a complex neural network is used instead of simple template matching.

As described above, in the feature point location search (step S1303), the CPU 608 detects a desired feature point in a predetermined small area of a normalized face image using corrected feature point location coordinates as reference and outputs the coordinate values of the detected feature point. At the same time, the CPU 608 outputs search position reliability to a threshold-based comparison (step S1304). A value equivalent to recognition output of a typical pattern recognition technique can be used as the search position reliability.

In the threshold-based comparison (step S1304), the CPU 608 makes a comparison with a threshold determined in a threshold setting (step S1306) and provides a comparison result to a selection (step S1307). In the threshold setting (step S1306), the CPU 608 determines the threshold based on results of a distance calculation (step S1305). Steps S1304 to S1307 are the same as steps S104 to S107 according to the first embodiment. Also, a group of steps enclosed in a box 133 are repeated for each feature point as in the case of the first embodiment.

As a result of the above processes, the location of each feature point is determined. The CPU 608 stores the determined locations of the feature points in the RAM 610 or the like. When the second embodiment is applied to a human (or animal) face image recognition apparatus, the CPU 608 renormalizes face image data accurately and extracts feature points needed for identification using the stored feature point locations. For example, the CPU 608 calculates the feature value of plural areas and regions with reference to the feature point locations and compares each local feature with registered data.

According to the second embodiment described so far, using a feature point location subjected to geometric constraint-based correction, the feature point location is searched for again in a small second search area of a normalized image (face image). This makes it possible to realize highly accurate location determination using the feature point location search (step S1303) to its full capacity while at the same time using geometric constraints from an eigenspace. Also, by selecting either the results of the geometric constraint-based correction (step S1302) or the results of the second feature point location search (step S1303) depending on the search position reliability, it is possible to realize location determination by suppressing the effect of contrast or occlusion. Furthermore, since the reliability of the feature point location search (step S1303) is determined based on the magnitude of the correction made by the geometric constraint-based correction (step S1302), it is possible to reduce the possibility of major misdetection.

Third Embodiment

Figure 14:
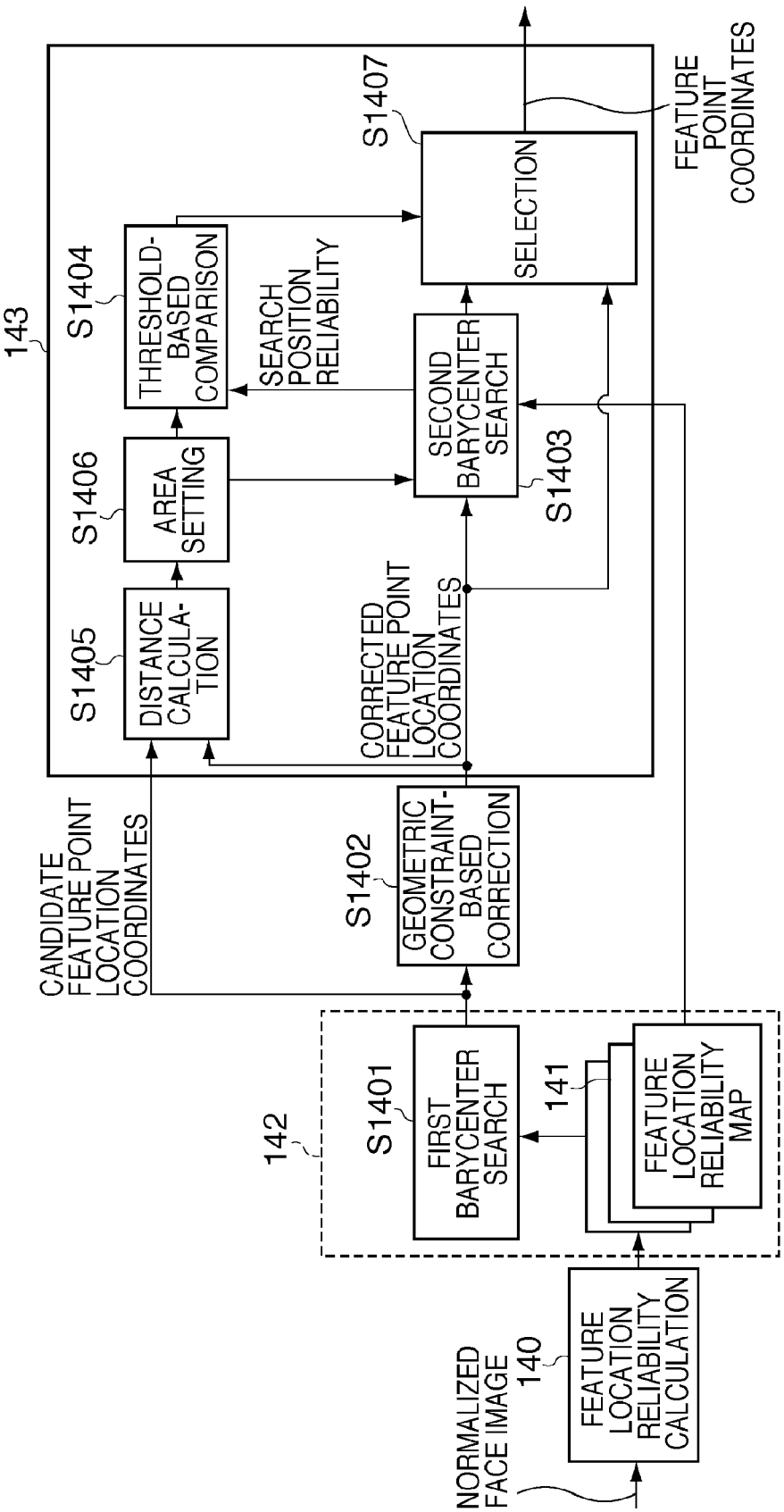
FIG. 14 is a diagram showing a flow of a feature point location determination process according to a third embodiment.

A feature point location determination apparatus according to a third embodiment will be described next. FIG. 14 is a diagram illustrating a major process flow of a feature point location determination process according to the third embodiment. In FIG. 14, steps S1401 to S1407 are carried out by the CPU 608.

Configuration of the feature point location determination apparatus according to the third embodiment is similar to that of the first embodiment (FIG. 6). Mainly differences from the first embodiment will be described below.

A feature location reliability calculation process 140 and feature location reliability map 141 in FIG. 14 are similar to the feature location reliability calculation process 10 and feature location reliability map 11 according to the first embodiment. Also, a first barycenter search (step S1401) and geometric constraint-based correction (step S1402) in FIG. 14 are similar to the first barycenter search (step S101) and geometric constraint-based correction (step S102) according to the first embodiment. The first barycenter search (step S1401) and geometric constraint-based correction (step S1402) calculate candidate feature point location coordinates and corrected feature point location coordinates, respectively. Processes enclosed in a box 142 are repeated for each feature point as in the case of the first embodiment.

A second barycenter search (step S1403) searches for an appropriate feature location reliability map based on the corrected feature point location coordinates as well as on a second search area determined by an area setting (step S1406) and outputs the feature location. According to the present embodiment, the second search area determined by the area setting (step S1406) is used in the second barycenter search setting (step S1403), but the second search area may also be used in the feature point location search (step S1303) according to the second embodiment.

In the threshold-based comparison (step S1404), the CPU 608 compares the search position reliability found by the second barycenter search (step S1403) with a predetermined threshold. In the area setting (step S1406), the CPU 608 determines the second search area (barycenter calculation area) in the second barycenter search (step S1403) based on results of a distance calculation (step S1405). In the distance calculation (step S1405), the CPU 608 calculates distance between candidate feature point location coordinates determined by the first barycenter search (step S1401) and corrected feature point location coordinates provided by the geometric constraint-based correction (step S1402). Details of the distance calculation (step S1405) are the same as in the first embodiment (step S105). Regarding the area setting (step S1406), it is conceivable, for example, to provide a distance threshold and two search areas in order for the CPU 608 to select the larger of the search areas when the distance exceeds the threshold and select the smaller of the search areas when the distance does not exceed the threshold. That is, the CPU 608 determines credibility of the results of the feature location reliability calculation process 140 based on magnitude of the geometric constraint-based correction. When the credibility is high, the CPU 608 searches the smaller search area using the second barycenter search process (step S1403). This makes it possible to establish the location of the feature point accurately.

Figure 18:
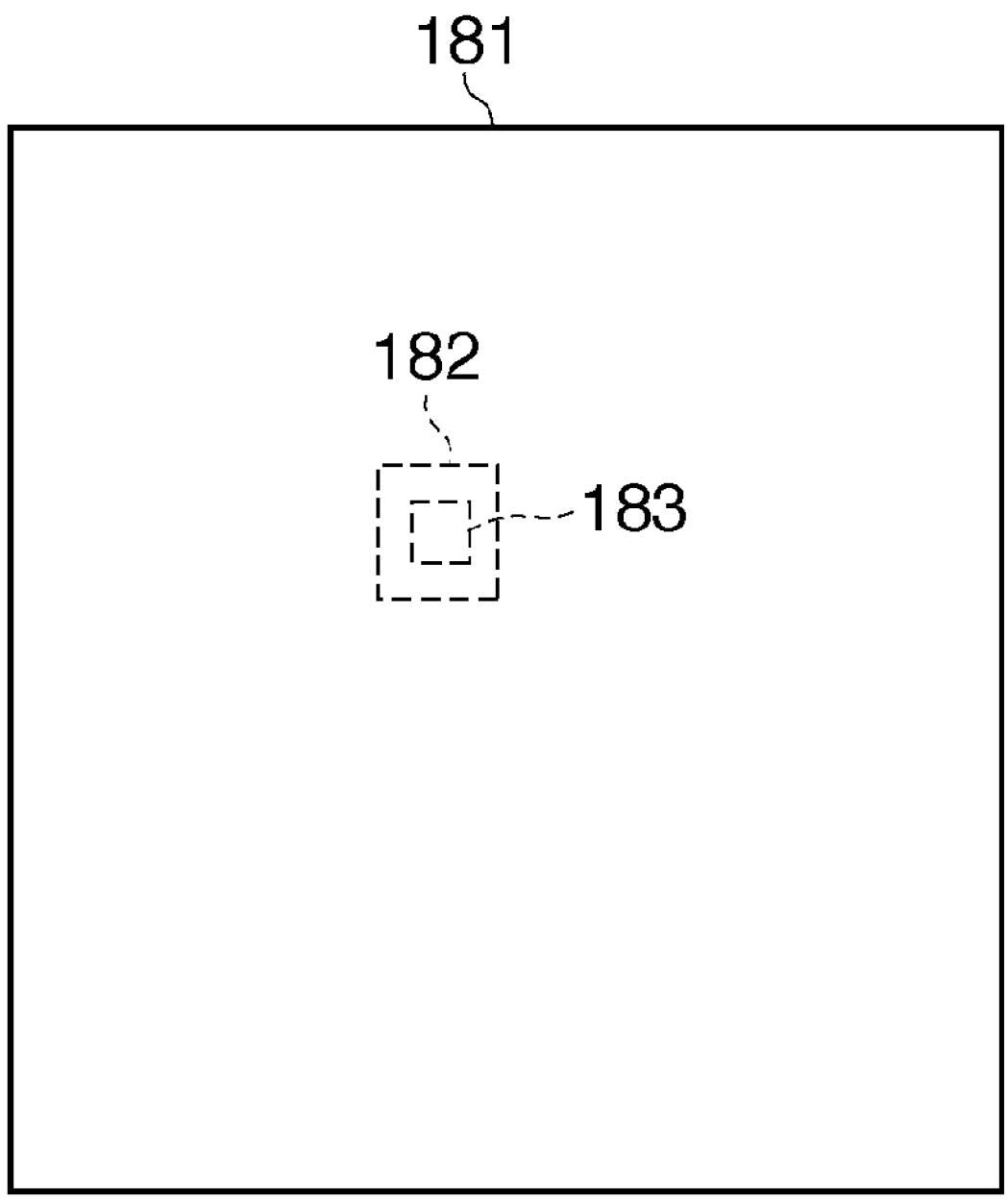
FIG. 18 is a diagram illustrating an example of a search area according to the third embodiment.

FIG. 18 is a diagram illustrating an example of a second search area. More specifically, it shows two search areas, a small search area 183 and large search area 182, in a reliability map 181. In the area setting (step S1406), the CPU 608 selects one of the two search areas based on the distance calculated in the distance calculation (step S1405) and provides the selected search area to the second barycenter search (step S1403). Two search areas are prepared for each type of feature point and the area setting (step S1406) selects an appropriate one of the search areas for each type of feature point. Incidentally, although two levels of search areas are used in the above example, it goes without saying that more than two levels of search areas may be used.

A threshold-based comparison (step S1404) provides a comparison result between the search position reliability and threshold to a selection (step S1407). Based on the comparison result, i.e., on the search position reliability, the selection (step S1407) selects either the results of the second barycenter search (step S1403) or the results of the geometric constraint-based correction (step S1402). Incidentally, the threshold-based comparison (step S1404) is the same as the threshold-based comparison (step S104) according to the first embodiment except that the threshold used by the threshold-based comparison (step S1404) is fixed.

A group of steps enclosed in a box 143 are repeated for each feature point, meaning that all the feature points go through the processes of S1403 to S1407. As a result of the above processes, the location of each feature point is determined.

The CPU 608 stores the determined locations of the feature points in the RAM 610 or the like. When the third embodiment is applied to a human (or animal) face image recognition apparatus, the CPU 608 renormalizes face image data accurately and extracts feature points needed for identification using the stored feature point locations. For example, the CPU 608 calculates the feature value of plural areas and regions with reference to the feature point locations and compares each local feature with registered data.

According to the third embodiment described so far, a final feature point location is searched for again using a feature point location subjected to geometric constraint-based correction. This makes it possible to realize highly accurate location determination using the feature location reliability calculation process 140 to its full capacity while at the same time using geometric constraints from an eigenspace. Also, by selecting either the results of the geometric constraint-based correction process (step S1402) or the results of the second search depending on the search position reliability, it is possible to realize location determination by suppressing the effect of contrast or occlusion. Furthermore, by making determinations with the area for the second barycenter search (step S1403) changed based on the magnitude of the correction made by the geometric constraint-based correction (step S1402), it is possible to realize highly accurate location determination.

Fourth Embodiment

Figure 15:
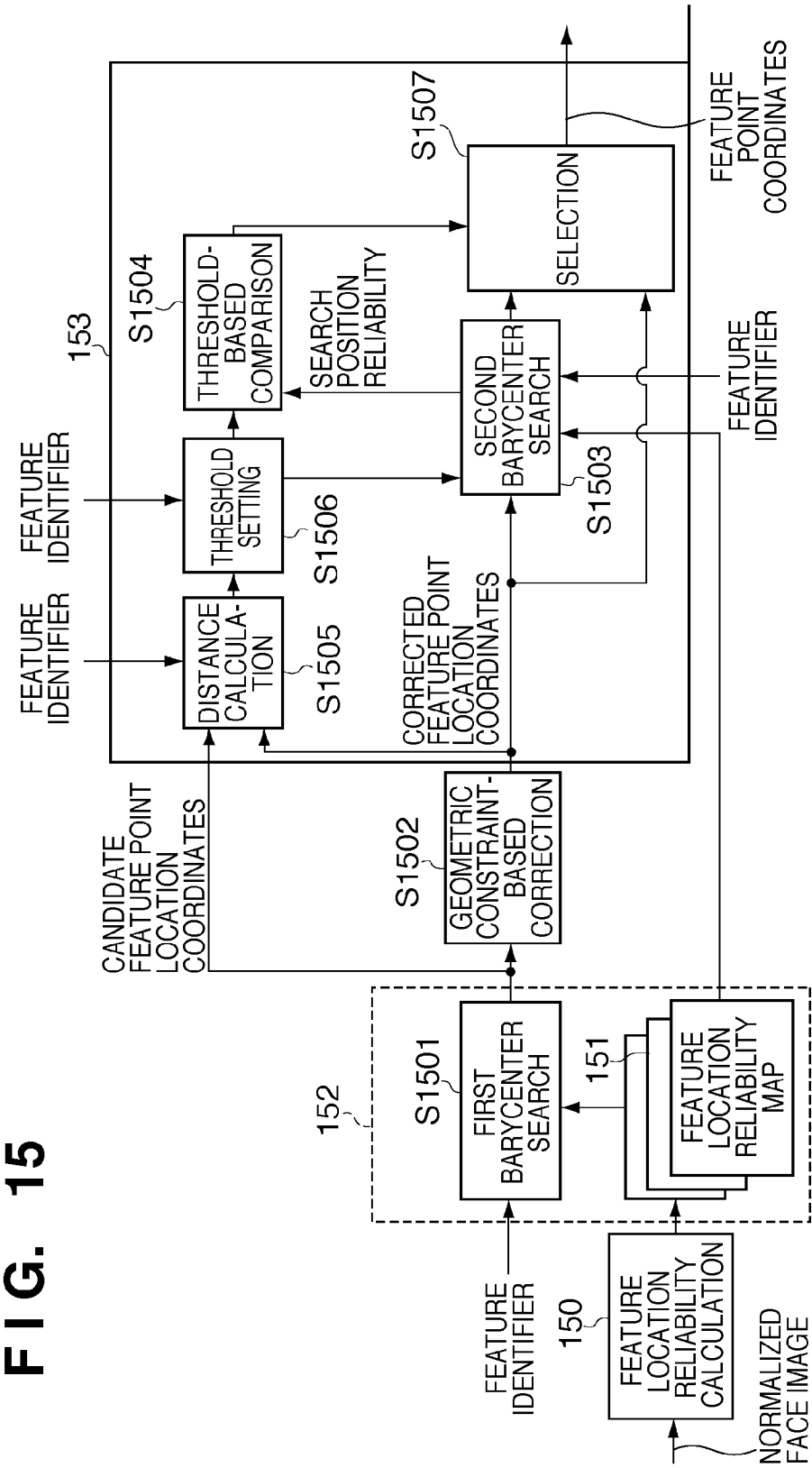
FIG. 15 is a diagram showing a flow of a feature point location determination process according to a fourth embodiment.

A feature point location determination apparatus according to a fourth embodiment will be described next. FIG. 15 is a diagram illustrating a major process flow of a feature point location determination process according to the fourth embodiment. In FIG. 15, steps S1501 to S1507 are carried out by the CPU 608.

Configuration of the feature point location determination apparatus according to the fourth embodiment is similar to that of the first embodiment (FIG. 6). Mainly differences from the first embodiment will be described below.

When a transfer of a normalized face image is finished, the feature location reliability calculation unit 611 starts calculating reliability using the image data stored in the RAM, where the reliability represents likelihood of existence of a candidate feature point location (feature location reliability calculation process 150 in FIG. 15). Reliability images thus generated constitute feature location reliability maps 151. The generated feature location reliability maps 151 are transferred to the RAM 610 via the DMAC 606. When the transfer is finished, the CPU 608 starts executing a program for feature point determination (steps S1501 to S1507). Steps enclosed in boxes 152 and 153 are repeated for each feature point.

Figure 16:
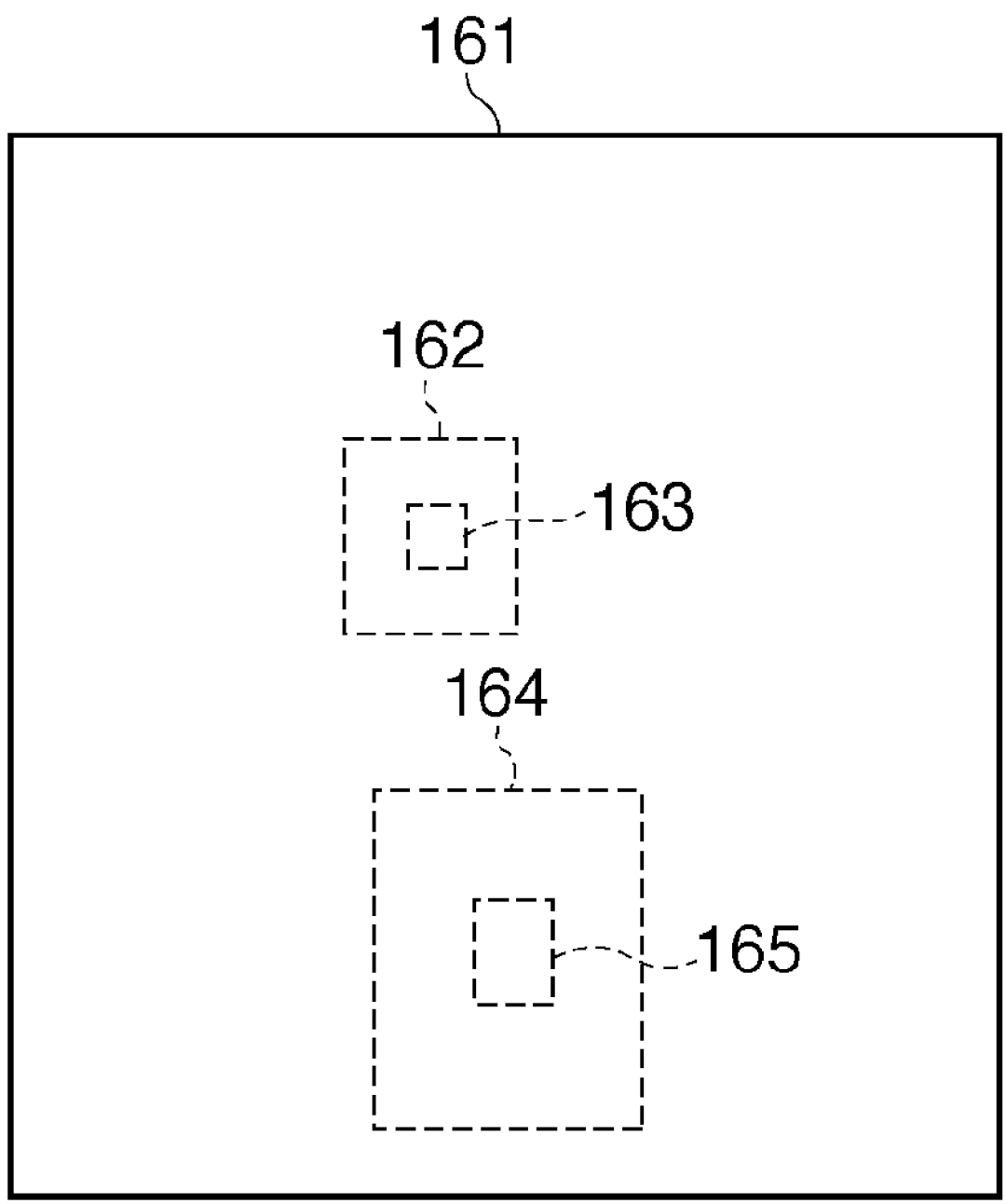
FIG. 16 is a diagram illustrating an example of search areas.

A first barycenter search (step S1501) calculates the barycenter of the feature point location reliability values in the search area 83 defined in the feature location reliability map 151 of each feature point. According to the fourth embodiment, the first barycenter search (step S1501) searches areas of different sizes according to the type of feature point to be localized. FIG. 16 is a diagram illustrating an example of search areas used by first barycenter search (step S1501) and second barycenter search (step S1503) to search feature location reliability maps. For the sake of explanation, search areas of two feature location reliability maps are shown together. In a feature location reliability map 161, the first barycenter search (step S1501) searches a search area 162 or 164 as a first search area depending on the feature point to be detected. The search area 164 is searched when the feature point searched for is the upper edge of the mouth in a face image while the search area 162 is used to search for the inside corner of the eye on the left as viewed in FIG. 16. Since the location of the feature point such as the upper edge of the mouth can vary greatly due to facial expressions and the like, a larger area is searched than in the case of a feature point such as a corner of an eye. According to the fourth embodiment, the search area for each feature point (feature identifier) is determined with reference to a table such as shown in FIG. 19. The first barycenter search (step S1501) uses data in the "search area 1" column of the table in FIG. 19. Ar_1_n (n=0 to 13) actually contains information about width and height of the area. It is assumed that the table is stored in the ROM 609.

Barycenter values obtained here are designated as coordinates of a candidate feature point location. A geometric constraint-based correction (step S1502) corrects the candidate feature point location obtained in the first barycenter search (step S1501), based on constraints on a geometric layout of the feature point. In the fourth embodiment, as in the case of the first embodiment, the geometric constraint-based correction (step S1502) corrects the coordinates of the candidate feature point location based on statistical layout relationship by geometric constraint-based processing using an eigenspace.

The second barycenter search (step S1503) searches for the feature location reliability map 151 again using the corrected feature point location coordinates. The second barycenter search (step S1503) searches for search areas of different sizes according to the location of the feature point, as in the case of the first barycenter search (step S1501). In FIG. 16, reference numerals 163 and 165 denote second search areas of the second barycenter search (step S1503). Again, the process operates with reference to area size information Ar_2_n (n=0 to 13) in the table shown in FIG. 19. For that, a feature identifier is provided to the second barycenter search (step S1503). The second search areas of the second barycenter search (step S1503) are smaller than the first search areas of the first barycenter search (step S1501). Besides, the second barycenter search (step S1503) searches different search areas according to characteristics (such as a lot of motion) of the feature point.

In a selection (step S1507), the CPU 608 selects detection results to be used as feature point location coordinates. Specifically, based on a comparison result produced by a threshold-based comparison (step S1504), the CPU 608 selects one of two sets of coordinates: results of the geometric constraint-based correction (step S1502) and results of the second barycenter search (step S1503). The threshold-based comparison (step S1504) produces the comparison result by comparing the search position reliability received from the second barycenter search (step S1503) with a threshold.

The threshold-based comparison process (step S1504) makes a comparison with a threshold determined in a threshold setting (step S1506). The threshold setting (step S1506) determines the threshold based on results of a distance calculation (step S1505). The threshold setting (step S1506) according to the fourth embodiment uses different thresholds for different feature points. Both reliability threshold 1 (Th_C_1_n; where n=0 to 13) and reliability threshold 2 (Th_C_2_n; where n=0 to 13) in the table shown in FIG. 19 vary with the feature point. In the threshold setting (step S1506), the threshold is determined with reference to the table. For example, for a feature point whose feature identifier is n, Th_C_1_n or Th_C_2_n is selected depending on the distance calculated by the distance calculation (step S1505). The threshold-based comparison (step S1504) makes the comparison with the threshold selected by the threshold setting (step S1506).

The feature location reliability map 151 generated by the feature location reliability calculation process 150 may vary in distribution depending on the feature. According to the fourth embodiment, using plural learning data sets which represent correct feature locations, optimum reliability thresholds 1 and 2 are determined in advance for each feature point and stored in a table such as shown in FIG. 19. According to the fourth embodiment, since an optimum reliability threshold is selected for each feature point, the selection process (step S1507) can make an appropriate selection according to the nature of the feature point to be extracted.

The distance calculation (step S1505) calculates distance between the feature point coordinates determined in the first barycenter search (step S1501) and the feature point coordinates corrected in the geometric constraint-based correction (step S1502), as in the case of the first embodiment. The threshold setting (step S1506) determines the threshold used for comparison in the threshold-based comparison (step S1504), based on results of the distance calculation (step S1505). According to the fourth embodiment, the threshold setting (step S1506) evaluates the distance using a different distance threshold for each feature point. The threshold setting (step S1506) determines a distance threshold Th_D_n (n=0 to 13) for use to evaluate the distance from the table shown in FIG. 19. The threshold setting (step S1506) sets a small distance threshold for a feature point such as the inside corner of the left eye which does not move much, and sets a large distance threshold for a feature point such as the upper edge of the mouth which moves greatly. Consequently, the threshold setting (step S1506) becomes liable to select a small reliability threshold for a feature point which moves greatly. This makes it likely that the selection (step S1507) will select the results of the second barycenter search (step S1503). That is, in the case of a feature point which moves greatly, the results of the second search are made to be trusted even when the magnitude of the geometric constraint-based correction is large.

A group of steps enclosed in a box 153 are repeated for each feature point, meaning that all the feature points go through the processes of S1503 to S1507.

As a result of the above processes, the location of each feature point is determined. The CPU 608 stores the determined locations of the feature points in the RAM 610 or the like. When the fourth embodiment is applied to a human (or animal) face image recognition apparatus, the CPU 608 renormalizes face image data accurately and extracts feature points needed for identification using the stored feature point locations. For example, the CPU 608 calculates the feature value of plural areas and regions with reference to the feature point locations and compares each local feature with registered data.

In addition to the advantages of the first embodiment, the fourth embodiment described so far offers the advantage of enabling more highly accurate feature point location detection by changing the area or threshold according to the nature (magnitude of movements) of the feature point.

Fifth Embodiment

Figure 17:
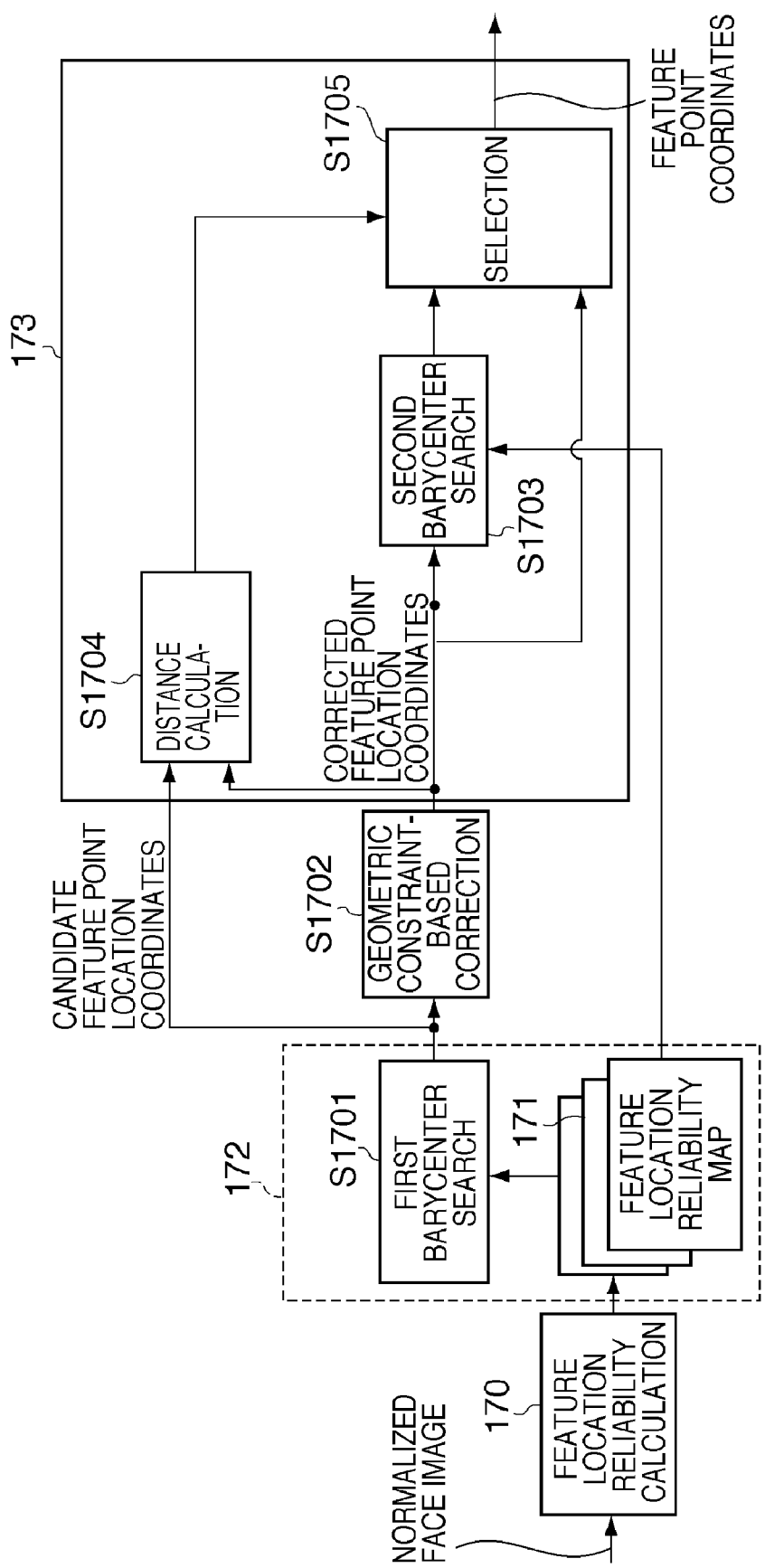
FIG. 17 is a diagram showing a flow of a feature point location determination process according to a fifth embodiment.

A feature point location determination apparatus according to a fifth embodiment will be described next. FIG. 17 is a diagram illustrating a major process flow of a feature point location determination process according to the fifth embodiment. In FIG. 17, steps S1701 to S1705 are carried out by the CPU 608.

Configuration of the feature point location determination apparatus according to the fifth embodiment is similar to that of the first embodiment (FIG. 6). Mainly differences from the first embodiment will be described below.

When a transfer of a normalized face image is finished, the feature location reliability calculation unit 611 starts calculating reliability using the image data stored in the RAM, where the reliability represents likelihood of existence of a candidate feature point location (feature location reliability calculation process 170 in FIG. 17). Reliability images thus generated constitute feature location reliability maps 171. The generated feature location reliability maps 171 are transferred to the RAM 610 via the DMAC 606. When the transfer is finished, the CPU 608 starts executing a program for feature point determination (steps S1701 to S1705). Steps enclosed in boxes 172 and 173 are repeated for each feature point.

In a first barycenter search (step S1701), the CPU 608 calculates the barycenter of feature point location reliability values in the first search area 83 of the feature location reliability map 171 for each feature point. Barycenter values obtained are designated as coordinates of a candidate feature point location. In a geometric constraint-based correction (step S1702), the CPU 608 corrects the candidate feature point location obtained in the first barycenter search (step S1701), based on constraints on a geometric layout of the feature point. In the fifth embodiment, as in the case of the first embodiment, the geometric constraint-based correction (step S1702) corrects the coordinates of the candidate feature point location based on the layout relationship by geometric constraint-based processing using an eigenspace.

In a second barycenter search process (step S1703), the CPU 608 searches for the feature location reliability map 171 again using the candidate feature point location coordinates corrected in the geometric constraint-based correction (step S1702).

In a selection (step S1705), the CPU 608 selects either corrected coordinates of the feature point location or results of the second barycenter search (step S1703) based on predetermined conditions. According to the fifth embodiment, the selection (step S1705) makes the selection based on a determination result of a distance determination (step S1704).

The distance determination process (step S1704) calculates distance between the feature point coordinates determined in the first barycenter search (step S1701) and the feature point coordinates corrected in the geometric constraint-based correction (step S1702). The distance is calculated in the manner described in the first embodiment. The distance determination (step S1704) determines whether or not difference between the coordinates before and after the geometric constraint-based correction (step S1702) is large, for example, by comparing the calculated distance and a threshold. If it is determined that the difference is large, the distance determination (step S1704) instructs the selection (step S1705) to select the corrected feature point location coordinates. On the other hand, if it is determined that the difference between the coordinates before and after the geometric constraint-based correction (step S1702) is small, the distance determination process (step S1704) instructs the selection (step S1705) to select the results of the second barycenter search (step S1703).

As a result of the above processes, the location of each feature point is determined. The CPU 608 stores the determined locations of the feature points in the RAM 610 or the like. When the fifth embodiment is applied to a human (or animal) face image recognition apparatus, the CPU 608 renormalizes face image data accurately and extracts feature points needed for identification using the stored feature point locations. For example, the CPU 608 calculates the feature value of plural areas and regions with reference to the feature point locations and compares each local feature with registered data.

According to the fifth embodiment described so far, reliability of the feature location reliability calculation process 170 is determined based on the difference between the coordinates before and after the geometric constraint-based correction process, and if it is found that the reliability is high, the results of the second search conducted based on the results produced by the feature location reliability calculation unit are outputted. This makes it possible to determine feature point locations at high accuracy using simple processes.

Other Embodiments

Although an apparatus equipped with a CPU has been described in the above embodiments, all the processes may be implemented by hardware. Alternatively, the components connected to the image bus 604 may be implemented by the CPU 608 and software.

Also, although location determination of facial organs defined to be feature points has been described in the above embodiments, the present invention is not limited to this and is applicable to various techniques for establishing characteristic locations in various objects with geometric constraints. Even when applied to facial organs, the present invention may be applied not only to location determination of whole organs on the face, but also to location determination of organ parts such as plural feature points around the mouth.

Also, although location determination of feature points in an image has been described in the above embodiments, the present invention is also applicable to processing of three- and higher-dimensional data as well as one-dimensional data.

Also, although in the above embodiments, description has been given of a technique which compares search position reliability with a predetermined threshold by varying the threshold according to the difference between the coordinates before and after a geometric constraint-based correction process as an example of a technique with a low processing load, the present invention is not limited to such a technique. For example, the present invention is also applicable to a technique which evaluates the difference between the coordinates before and after the geometric constraint-based correction process using an evaluation function established by learning and thereby selects between corrected feature point location coordinates and feature point location coordinates found by a second search.

Embodiments of the present invention have been described in detail above, and the present invention can be embodied, for example, as a system, apparatus, method, program, storage medium, or the like. Specifically, the present invention may be applied either to a system consisting of multiple apparatus or to equipment consisting of a single apparatus.

Incidentally, the present invention is also achieved when a software program which implements the functions of the above embodiments is supplied directly or remotely to a system or apparatus and program code of the software program is read out and executed by a computer of the system or apparatus. In that case, the program corresponds to the illustrated flowcharts according to the embodiments.

Thus, the program code itself installed on the computer to implement functions and processes of the present invention on the computer also implements the present invention. That is, the present invention also includes the computer program which implements the functions and processes of the present invention.

In that case, the program code may take any form including object code, programs executed by an interpreter, and script data supplied to an OS as long as it has program functions.

Various types of the storage media can be used to supply the computer program.

Besides, the program can also be supplied via an Internet homepage. In that case, the user is supposed to connect to an Internet homepage and download the computer program of the present invention onto a recording medium such as a hard disk.

The functions of the above embodiments may be implemented not only by the program read out and executed by the computer, but also in conjunction with an OS or the like running on the computer. In that case, the functions of the above embodiments are implemented by part or all of the actual processing executed by the OS or the like in accordance with instructions from the program.

The embodiments described above allow plural feature point locations in a statistically predetermined layout relationship to be determined at high accuracy using simple processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-051117, filed Feb. 29, 2008, which is hereby incorporated by reference herein in its entirety.

What is claimed is:

1. A feature point location determination method comprising: the following steps and using a processor to perform one or more of said steps:

a first search step of searching for locations of a plurality of feature points in a predetermined first search area in an image;

a location correction step of correcting the locations of the plurality of feature points based on a geometric layout relationship among the plurality of feature points searched for by in said first search step;

a second search step of setting a second search area based on the locations of the plurality of feature points corrected by in said location correction step and searching for locations of the feature points in the second search area;

a reliability calculation step of calculating reliability of each of the feature points searched for from the second search area based on reliability distribution in the second search area;

a distance calculation step of calculating distance between the locations of each of the feature points before and after correction in said location correction step;

a determination step of determining a threshold based on the distance calculated in said distance calculation step; and a selection step of selecting one of the location corrected in said location correction step and the location searched for in said second search step, as the location of each of the feature points to be localized, based on a comparison result between the reliability calculated in said reliability calculation step and the threshold determined in said determination step.

2. A feature point location determination apparatus comprising:

a first search unit configured to search for locations of a plurality of feature points in a predetermined first search area in an image;

a location correction unit configured to correct the locations of the plurality of feature points based on a geometric layout relationship among the plurality of feature points searched for by said first search unit;

a second search unit configured to set a second search area based on the locations of the feature points corrected by said location correction unit and configured to search for locations of the feature points in the second search area;

a reliability calculation unit configured to calculate reliability of each of the feature points searched for from the second search area based on reliability distribution in the second search area;

a distance calculation unit configured to calculate distance between the loactions of each of the feature points before and after by said location unit:

a determination unit configured to determine a threshold based on the distance calculated by said distance calculation unit; and a selection unit configured to select one of the location corrected by said location correction unit and the location searched for by said second search unit, as the location of each of the feature points to be localized, based on a comparison result between the reliability calculated by said reliability calculation unit and the threshold determined by said determination unit.

3. A non-transitory computer-readable medium storing a program which makes a computer perform the feature point location determination method according to claim 1.

4. The method according to claim 1, wherein the second search area is smaller than the first search area.

5. The method according to claim 1, wherein said location correction step generates a projection vector by projecting an input vector whose elements are made up of coordinate values of the feature points onto an eigenspace using a pre-generated eigenvector, inverse-projects the projection vector using the eigenvector, and thereby acquires corrected feature point locations.

6. The method according to claim 5, wherein the eigenvector is generated by principal component analysis.

7. The method according to claim 1, further comprising a generation step of generating a reliability map which represents a distribution of reliability of existence of each of the feature points in the image, wherein said first search step and said second search step search for the location of each of the feature points based on the reliability map.

8. The method according to claim 1, further comprising a generation step of generating a reliability map which represents a distribution of reliability of existence of each of the feature points in the image, wherein said first search step searches for the location of each of the feature points based on the reliability map; and said second search step searches for the location of each of the feature points using the image.

9. The method according to claim 1, further comprising a change step of changing size of the second search area according to the distance calculated in said distance calculation step.

10. The method according to claim 1, further comprising a change step of changing the second search area for each type of feature point to be localized.

11. The method according to claim 1, wherein said determination step determines the threshold based on conditions set for each type of feature point to be localized.

12. The method according to claim 1, wherein the feature points to be localized are facial organs of an animal or characteristic parts of an organ.

* * * * *